US012597336B1

(12) United States Patent
Namm

(10) Patent No.: US 12,597,336 B1
(45) Date of Patent: Apr. 7, 2026

(54) DEVICE AND METHOD FOR REMOTE ACTIVATION OF AN EMERGENCY ALARM IN A PUBLIC SAFETY RADIO

(71) Applicant: MOTOROLA SOLUTIONS, INC., Chicago, IL (US)

(72) Inventor: Joseph Namm, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 16 days.

(21) Appl. No.: 18/966,338

(22) Filed: Dec. 3, 2024

(51) Int. Cl.
*G08B 27/00* (2006.01)

(52) U.S. Cl.
CPC .................................. *G08B 27/001* (2013.01)

(58) Field of Classification Search
None
See application file for complete search history.

(56) References Cited

U.S. PATENT DOCUMENTS

| | | | | |
|---|---|---|---|---|
| 5,045,839 A | 9/1991 | Ellis et al. | | |
| 7,005,980 B1 * | 2/2006 | Schmidt | G08B 21/0288 | 340/539.13 |
| 7,245,216 B2 * | 7/2007 | Burkley | H04W 4/024 | 340/8.1 |
| 7,976,480 B2 * | 7/2011 | Grajales | A61B 5/6804 | 600/528 |
| 9,159,206 B2 | 10/2015 | Luei et al. | | |
| 9,642,131 B2 * | 5/2017 | Bohlander | H04N 5/77 | |
| 10,257,669 B2 | 4/2019 | Patel et al. | | |
| 2004/0070515 A1 * | 4/2004 | Burkley | G01S 5/0072 | 340/539.2 |
| 2004/0192353 A1 * | 9/2004 | Mason | G01S 5/0289 | 455/457 |
| 2005/0001720 A1 * | 1/2005 | Mason | G01S 19/17 | 340/539.2 |
| 2006/0158329 A1 * | 7/2006 | Burkley | H04W 4/029 | 370/254 |
| 2007/0103292 A1 * | 5/2007 | Burkley | G07C 9/28 | 340/539.2 |
| 2009/0322513 A1 * | 12/2009 | Hwang | H04W 4/90 | 600/301 |
| 2010/0214118 A1 * | 8/2010 | Losee | G01S 5/0027 | 340/8.1 |
| 2014/0038668 A1 * | 2/2014 | Vasavada | H04L 12/1859 | 455/556.1 |
| 2015/0264550 A1 * | 9/2015 | Johnson | G08B 25/016 | 455/404.2 |
| 2018/0174430 A1 * | 6/2018 | Sieja | G08B 21/0453 | |

(Continued)

*Primary Examiner* — Muhammad Adnan
(74) *Attorney, Agent, or Firm* — Barbara R Doutre

(57) ABSTRACT

An incident command radio (102) is configured to provide remote activation of an emergency alarm at a first responder radio (104) in response to being notified of a radio user under duress. Parameters are measured and analytics applied by the first responder radio (104) to detect a radio user under duress. In response to detecting duress, the first responder radio (104) automatically broadcasts that the first responder radio is a candidate for remote activation of emergency. The broadcast is received by the incident command radio (102) and added to a list. The incident command radio (102) remotely activates the emergency alarm of the first responder radio (104). The emergency alarm may thus be triggered without activation of an emergency button at the first responder radio (104).

12 Claims, 9 Drawing Sheets

(56) References Cited

U.S. PATENT DOCUMENTS

| | | | | |
|---|---|---|---|---|
| 2019/0090137 | A1* | 3/2019 | Cutcher | H04W 16/10 |
| 2019/0318609 | A1 | 10/2019 | Obayuwana et al. | |
| 2021/0027591 | A1* | 1/2021 | Davies | H04N 23/69 |
| 2022/0399014 | A1* | 12/2022 | Tan | G10L 15/22 |
| 2024/0127688 | A1* | 4/2024 | Gustof | G08B 25/016 |

* cited by examiner

DEVICE AND METHOD FOR REMOTE ACTIVATION OF AN EMERGENCY ALARM IN A PUBLIC SAFETY RADIO

This application is related to Serial No. xx,xxx,xxx (MSI Ref: PAT31711) commonly assigned to Motorola Solutions, Inc. and filed of even date.

BACKGROUND

Public safety radios are often used in dangerous environments, such as fire incidents, downed structures, and the like. There are situations where a firefighter might be unable to communicate with an incident command radio due to injury or environmental conditions occurring at the incident. For example, a firefighter searching a structure may become trapped under debris and unable to operate their radio to ask for assistance. As another example, an injured firefighter may not be able to respond to queries sent from an incident command radio. Accordingly, there is a need for improved detection of an emergency and response to the detected emergency.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
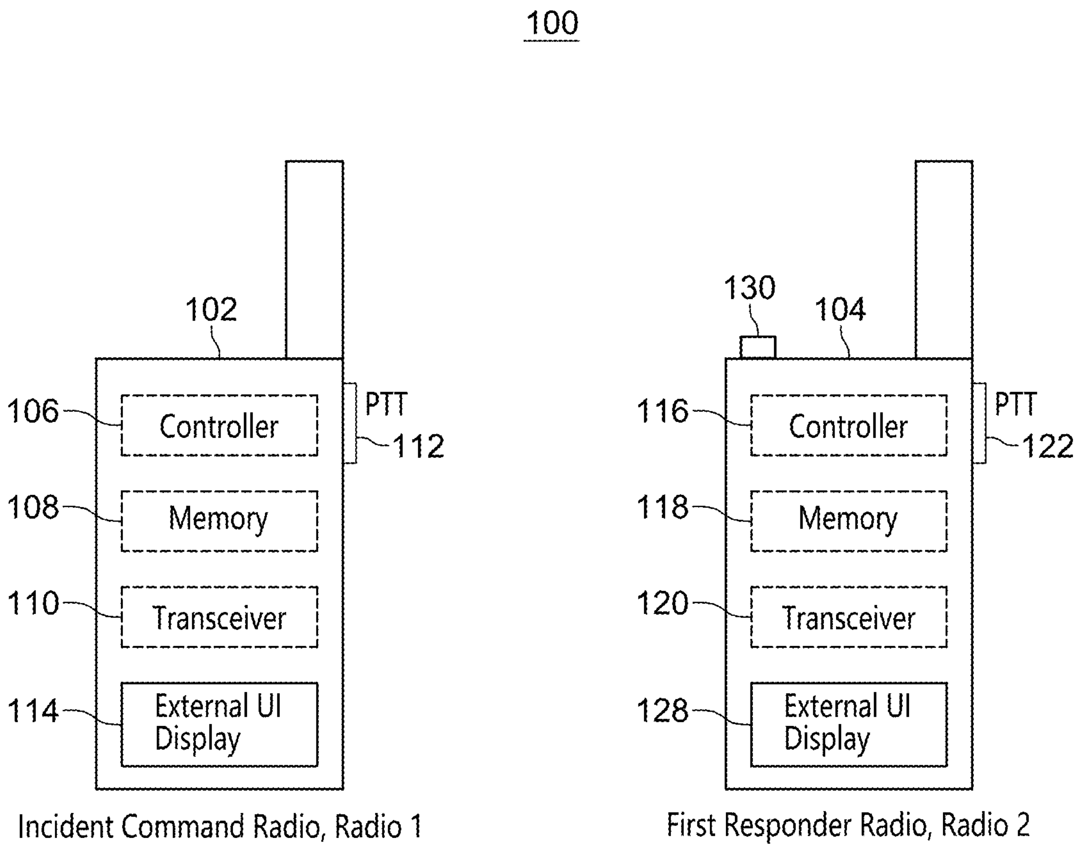
FIG. 1 depicts an incident command radio and a first responder radio formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein an incident command radio configured to provide remote activation of an emergency alarm of a first responder radio, where the first responder radio user is determined to be under duress, and where the first responder radio is not currently operating in an emergency mode. In some embodiments, parameter measurements and analytics performed thereon to determine duress of a radio user of the first responder radio may be performed by the incident command radio. In other alternative embodiments, the parameter measurements and analytics applied thereon may be performed by the first responder radio itself. For the purposes of this application, emergency mode refers to a known operating mode where an emergency alert is automatically sent by a radio if the user is incapacitated. For example, a man down feature at the radio automatically sends an emergency alert (without any remote activation). The remote activation of the various embodiments, is based on environments where the first responder radio is not currently operating in the emergency mode, and where measured parameters are compared to thresholds indicative of duress.

In accordance with one example embodiment, a method is provided in which an incident command radio operating outside of a hazard zone of the incident scene receives a trigger from the first responder radio identifying the first responder radio as a candidate for potential remote emergency activation upon entry of the first responder radio into the hazard zone of the incident scene. The identified first responder radio is added to a user selectable list generated at the incident command radio which includes other candidates of first responder radios also identified for potential remote emergency activation while operating in the hazard zone. The incident command radio attempts communication with the first responder radio by selecting the first responder radio from the user selectable list or by calling the radio in a group call. In response to a failed communication attempt, the incident command radio measures one or more parameters of the first responder radio, the parameters having been pre-stored in a memory of the incident command radio. The parameters being measured are associated with detecting duress of the radio user of the first responder radio. Analytics are applied by the incident command radio to the measured parameters of the first responder radio to identify that the first responder radio in the hazard zone is being operated by a radio user under duress. In response to identifying that the radio user is under duress, the incident command radio remotely activates the emergency alarm of the first responder radio.

In accordance with another example embodiment an incident command radio comprises a transceiver, a memory and a controller operatively coupled for two-way communications with a first responder radio, the controller being configured to: receive, at the incident command radio, a trigger from the first responder radio identifying the first responder radio as a candidate for potential remote emergency activation upon entering a hazard zone of an incident scene; add the identified first responder radio to a user selectable list of the incident command radios, the user selectable list including other candidates of first responder radios also identified for potential remote emergency activation while in the hazard zone; attempt communication from the incident command radio to the first responder radio based on a user selection from the user selectable list; in response to a failed attempt at communication, measure one or more parameters of the first responder radio by the incident command radio, the parameters being pre-stored in a memory of the incident command radio, and the parameters being associated with detecting duress of a radio user of the first responder radio; apply analytics, by the incident command radio, to the measured parameters to identify whether the radio user of the first responder radio is under duress; and in response to identifying that the radio user is under duress, remotely activate an emergency alarm of the first responder radio by the incident command radio.

In accordance with an alternative example embodiment a method is provided comprising: operating an incident command radio outside of a hazard zone of an incident scene, while a first responder radio enters the hazard zone of the incident scene; measuring, by the first responder radio, one or more parameters of the first responder radio, while the first responder radio is operating within the hazard zone. The measurable parameters may be pre-stored in a memory of the first responder radio, and are associated with detecting duress of a radio user of the first responder radio. The method continues with applying analytics to the one or more measured parameters of the first responder radio by the first responder radio; determining, based on the analytics performed by the first responder radio, that the radio user of the first responder radio is under duress. The method continues with broadcasting, from the first responder radio, a message indicating that first responder radio is a candidate for remote activation of emergency. The method continues with receiving, at the incident command radio, the broadcast from the first responder radio identifying the first responder radio as a candidate for potential remote emergency activation; adding the first responder radio and associated user to a user selectable list presented on a user interface display of the incident command radio, the user selectable list including other first responder radios associated with respective radio users currently under duress within the hazard zone; and selecting one or more first responder radios from the user selectable list; and remotely activating an emergency alarm of the first responder radio.

In accordance with the alternative example embodiment there is provided a communication system comprising an incident command radio and a first responder radio, the first responder radio comprising: a transceiver, a memory and a controller operatively coupled for two-way communications with the incident command radio, the first responder radio operating within a hazard zone of an incident scene, while the incident command radio operates outside of the hazard zone. The controller of the first responder radio is configured to: measure one or more parameters of the first responder radio, by the first responder radio, while the first responder radio is operating within the hazard zone, the parameters being pre-stored in the memory of the first responder radio, and the parameters being associated with detecting duress of a radio user of the first responder radio; apply analytics to the one or more measured parameters of the first responder radio; determine, based on the analytics, that the radio user of the first responder radio is under duress; broadcast, from the first responder radio, that the first responder radio is a candidate for remote activation of emergency; receive, at the incident command radio, the broadcast from the first responder radio identifying the first responder radio as a candidate for potential remote emergency activation; add the first responder radio and associated radio user to a user selectable list of the incident command radio, present the user selectable list on a user interface display of the incident command radio, the user selectable list including other first responder radios associated with respective radio users currently under duress within the hazard zone; and remotely activate an emergency alarm of the first responder radios by the incident command radio based on a selection made from the user selectable list.

Each of the above-mentioned embodiments will be discussed in more detail below, starting with example system and device architectures of the system in which the embodiments may be practiced, followed by an illustration of processing blocks for achieving an improved technical method, device, and system for remote activation of an emergency alarm at a first responder radio.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 depicts a block diagram of a communication system 100 operating in accordance with some embodiments. Communication system 100 includes an incident command radio 102 and one or more first responder radios, shown as first responder radio 104. Both radios 102, 104 are wireless, portable, battery operated, two-way public safety radios having push-to-talk (PTT) functionality. Both radios operate within the same public safety network. The public safety network may be a conventional network or a trunked network. Conventional radio systems have dedicated channels for specific groups and users, and the user manually selects the channels they want. Trunked radio systems automatically connect users to available radio channels. Trunked radios rely on repeaters to re-transmit radio signals to expand the coverage of the devices. The incident command radio 102 and first responder radio 104 may be configured, for example, for land mobile radio (LMR) conventional operation or trunked APCO25 operation.

The incident command radio 102 is typically operated by an incident commander at an incident scene, while the first responder radio 104 is typically operated by a first responder firefighter at the incident scene. For the purposes of this application, the embodiments pertain to communication between the incident command radio 102 and first responder radio 104, wherein the incident command radio determines that one or more first responder radios, such as first responder radio 104, is being operated by a radio user under duress, without currently operating in an emergency mode at the first responder radio. The determination of duress, as will be described herein, is based on a failed attempt at communication from the incident command radio 102 to the first responder radio 104 in conjunction with subsequent analytics associated with measurable parameters of the first responder radio 104. In accordance with some embodiments, the incident command radio 102, remotely activates an emergency alarm of the first responder radio 104 based on the indication of duress.

Incident command radio 102 generally comprises a controller 106, a memory 108, a transceiver 110, a push-to-talk (PTT) button 112, and an external user interface (UI) display 114. First responder radio 104 generally comprises a controller 116, a memory 118, a transceiver 120, a push-to-talk button (PTT) 122, an external user interface (UI) display 128, and an emergency button 130.

The controller 106 of incident command radio 102 includes a processor and an analytics engine (not shown) operating based on instructions stored in memory 108. For the purposes of this application, memory 108 is shown generally, but is understood to represent various types of memory for permanent and/or temporary storage.

In accordance with some embodiments, while the incident command radio 102 operates outside of a hazard zone of the incident scene, the controller 106 of incident command radio 102 receives a trigger from first responder radio 104 identifying the first responder radio 104 as a candidate for potential remote emergency activation upon entry into a hazard zone. The trigger may be transmitted from the first responder radio 104, via wireless RF communication to the incident command radio 102, as the first responder radio 104 enters the hazard zone.

The controller 106 of incident command radio 102 adds (registers) the identified first responder radio 104 to a user selectable list temporarily stored in the memory 108 of incident command radio 102. The user selectable list may include other candidates of first responder radios that have sent similar triggers to the incident command radio 102. The user selectable list may thus contains a plurality of temporarily registered first responder radios (e.g. first responder name and ID) while operating in the hazard zone of the incident scene. The user selectable list may be dynamically updated in memory 108 in response to other candidates of first responder radios that have sent similar triggers to the incident command radio 102. The user selectable list may be presented on the user interface display 114 of incident command radio 102. Examples of user selectable lists and the selection of a first responder radio 104 by the incident command radio 102 will be described in conjunction with FIGS. 5, 6, 7.

In accordance with some embodiments, the incident command radio 102 is now armed with the duress detection function. Upon being armed, the incident command radio may attempt communication, via a user selection to the user selectable list, with the first responder radio 104 (or with other first responder radios on the user selectable list).

In some embodiments, the communication attempt may be made manually at the incident command radio 102 by selecting a first responder radio, such as first responder radio 104, from the user selectable list presented on the UI display 114. The manual selection from the list allows the incident commander to control the communication attempts. The incident commander performing a manual selection from the list is advantageous, because a specific user without recent history of communication may be targeted. Firefighters normally operate in a unit of two or more, with one firefighter (officer) designated as the primary communicator of the unit. If the incident commander loses contact with the officer there may be a need to remotely activate emergency on other members of the officer's unit.

In accordance with some embodiments, the communication attempt may be made automatically by the incident command radio 102 to the first responder radio 104 and to some or all of the candidate first responder radios, stored in the list. The first responder radios may be targeted as a group, individually, or as target multiple subscribers in one message. The automated communication attempt allows for a quick verification of which first responder radio(s) respond back (e.g. acknowledge) the communication attempt, and identify those first responder radios which failed responding to the communication attempt made by the incident command radio 102 (e.g. first responder radio 104 failed to acknowledge).

In accordance with some embodiments, in response to a failed attempt at communication, the incident command radio 102 begins measuring one or more parameters of the first responder radio 104, the parameters being associated with detecting duress of a radio user of the first responder radio. The parameters being measured may be pre-stored in the memory 108 of the incident command radio 102 and may further include associated predetermined thresholds.

In accordance with some embodiments, the controller 106 of incident command radio 102 performs analytics on the measured parameters to identify whether the radio user of the first responder radio 104 is under duress. In some embodiments, and as will be described later, the measurable parameters associated with identifying duress of the first responder radio 104 may be based on one or more of: location, audio, and/or a radio operation. (I believe this is important to the invention, and I have claimed it throughout the dependent claims, as well as at FIG. 4) The measurable parameters associated with the first responder radio 104 will be described in greater detail at FIG. 4. The incident command radio 102 in response to identifying that the radio user of first responder radio 104 is under duress, remotely activates an emergency alarm of the first responder radio. Accordingly, the first responder radio 104 can advantageously be placed in a remote emergency, without ever having the radio user activate the emergency button 130 at the first responder radio 104.

Figure 2:
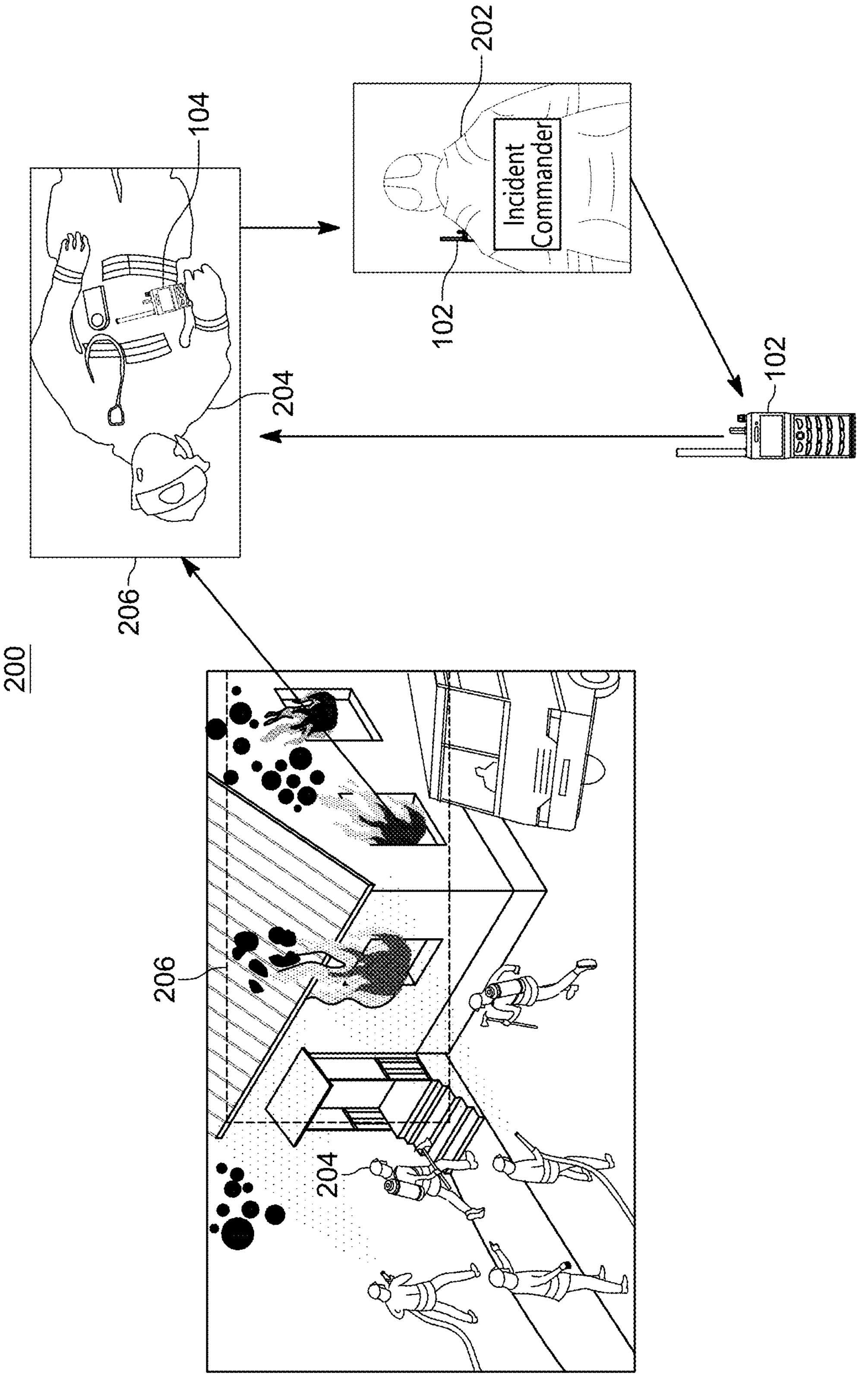
FIG. 2 depicts an example fire incident scene within which the incident command radio and first responder radio of FIG. 1 operate in accordance with some embodiments.

FIG. 2 depicts an incident scene 200 including a hazard zone 202. In this example, the hazard zone 202 is defined by a geofence surrounding a burning building and/or a known collapse zone that can involve firefighters outside but next to the building. The incident command radio 102 is operating outside of the hazard zone 202, while the first responder radio 104 is entering the hazard zone. In accordance with the embodiments, the incident command radio 102 receives a trigger from the first responder radio 104 identifying the first responder radio as a candidate for potential remote emergency activation upon entering the hazard zone 202. The incident command radio 102 adds the identified first responder radio 104 to a user selectable list stored in the memory 108. The user selectable list further includes other candidates of first responder radios which have identified themselves as candidates for potential remote emergency activation in the hazard zone. The incident command radio 102 upon detecting that the first responder radio 104 has entered the hazard zone 202, attempts communication with first responder radio 104.

In accordance with some embodiments, the communication attempt may be performed manually by the incident command radio 102. In accordance with other embodiments the communication attempt may be dynamically configured by the incident command radio 102 to automatically attempt communication periodically until a failed communication with first responder radio 104 occurs, or until the first responder radio 104 exits the hazard zone 202.

The communication attempt may be automatically sent from the incident command radio 102 to the first responder radio 104 as well as to other candidates of first responder radios stored in the list which were identified for potential remote emergency activation while in the hazard zone. The communication attempt may be sent simultaneously to the first responder radio 104 and other candidates of first responder radios stored in the list which were identified for potential remote emergency activation while in the hazard zone.

In response to a successful communication, normal radio operation continues. In response to a failed attempt at communication, the incident command radio 102 measures one or more parameters associated with the first responder radio 104, the parameters being pre-stored in the memory 108 of the incident command radio. The stored parameters are associated with detecting duress of a radio user of the first responder radio 104. The incident command radio 102 performs analytics on the measured parameters to identify whether the radio user of the first responder radio is under duress. In response to identifying the radio user as being under duress, the incident command radio 102 remotely activates an emergency alarm of the first responder radio 104. Examples of the parameters associated with the first responder radio 104 will be described in conjunction with FIG. 4.

Figure 3:
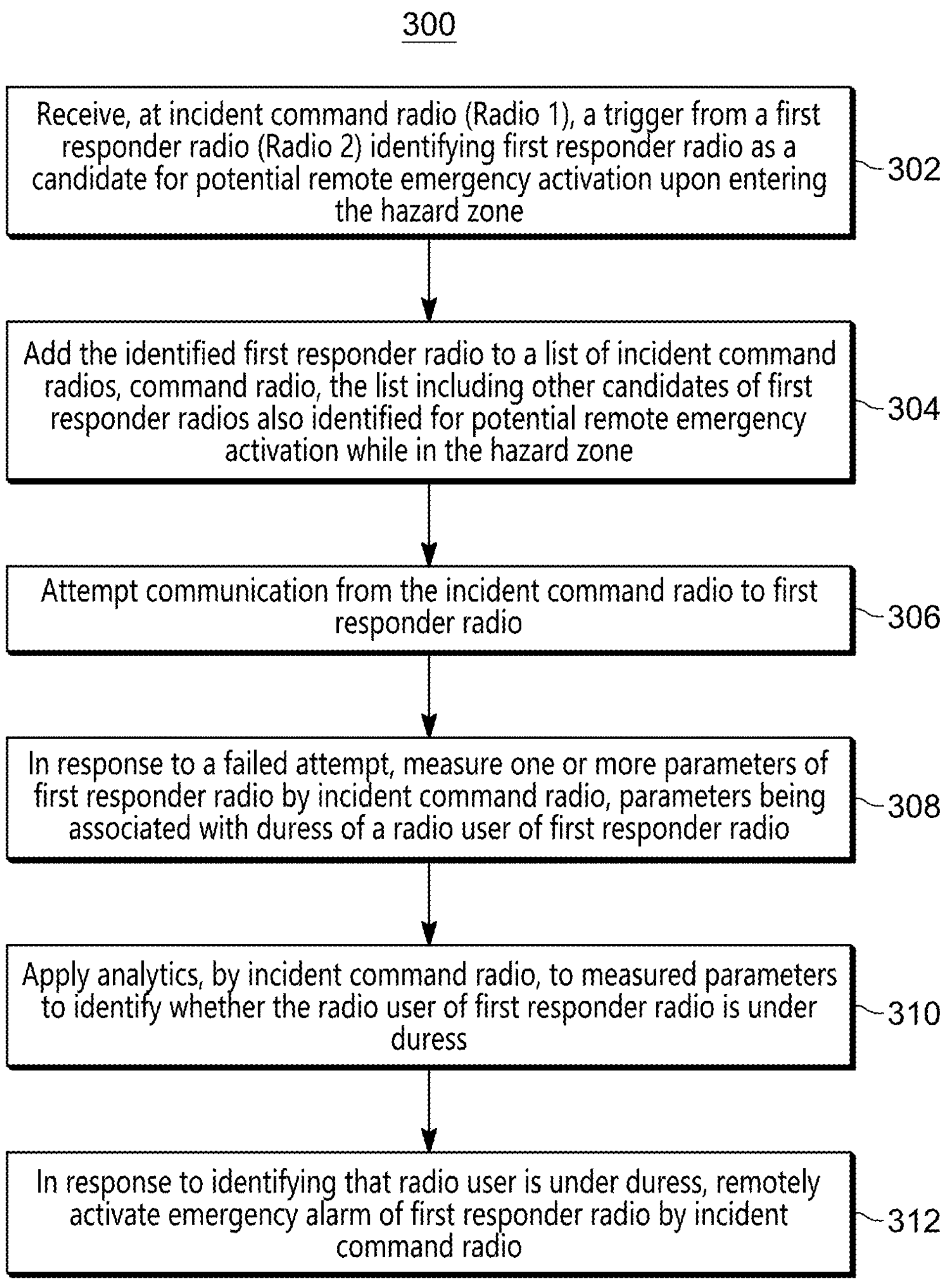
FIG. 3 is a flowchart of a method for an incident command radio to detect a first responder radio in a state of emergency in accordance with some embodiments.

FIG. 3 is a flowchart of a method 300 of operating an incident command radio at an incident scene. For example, the method may be applied to the incident command radio 102 of FIGS. 1 and 2 to detect a first responder radio in a state of emergency and remotely activate an emergency alarm in accordance with some embodiments.

The method 300 takes place while the incident command radio is operating outside of a hazard zone, such as the hazard zone 202 of the incident scene 200 of FIG. 2. The method begins at 302 with receiving, at the incident command radio 102, a trigger from a first responder radio 104 identifying the first responder radio as a candidate for potential remote emergency activation upon entering the hazard zone 202. The method continues to 304 with adding the identified first responder radio to a user selectable list stored in the memory 108 of the incident command radio 102, the user selectable list including other candidates of first responder radios also identified for potential remote emergency activation in the hazard zone.

The method continues to 306 with attempting communication from the incident command radio 102 to the first responder radio 104. The communication attempt may be made anytime while the firefighter is operating within the hazard zone. In response to a failed attempt at communication at 308, the method proceeds to measuring at 310 one or more parameters of the first responder radio 104 by the incident command radio 102, the parameters being pre-stored in the memory 108 of the incident command radio 102, and the parameters being associated with detecting duress of a radio user of the first responder radio. The method proceeds to 312 with applying analytics, by the controller 106 of incident command radio 102, on the measured parameters to identify whether the radio user of the first responder radio 104 is under duress. In response to identifying that the radio user of first responder radio 104 is under duress, the method continues at 312 with remotely activating an emergency alarm of the first responder radio 104 by the incident command radio 102.

Figure 4:
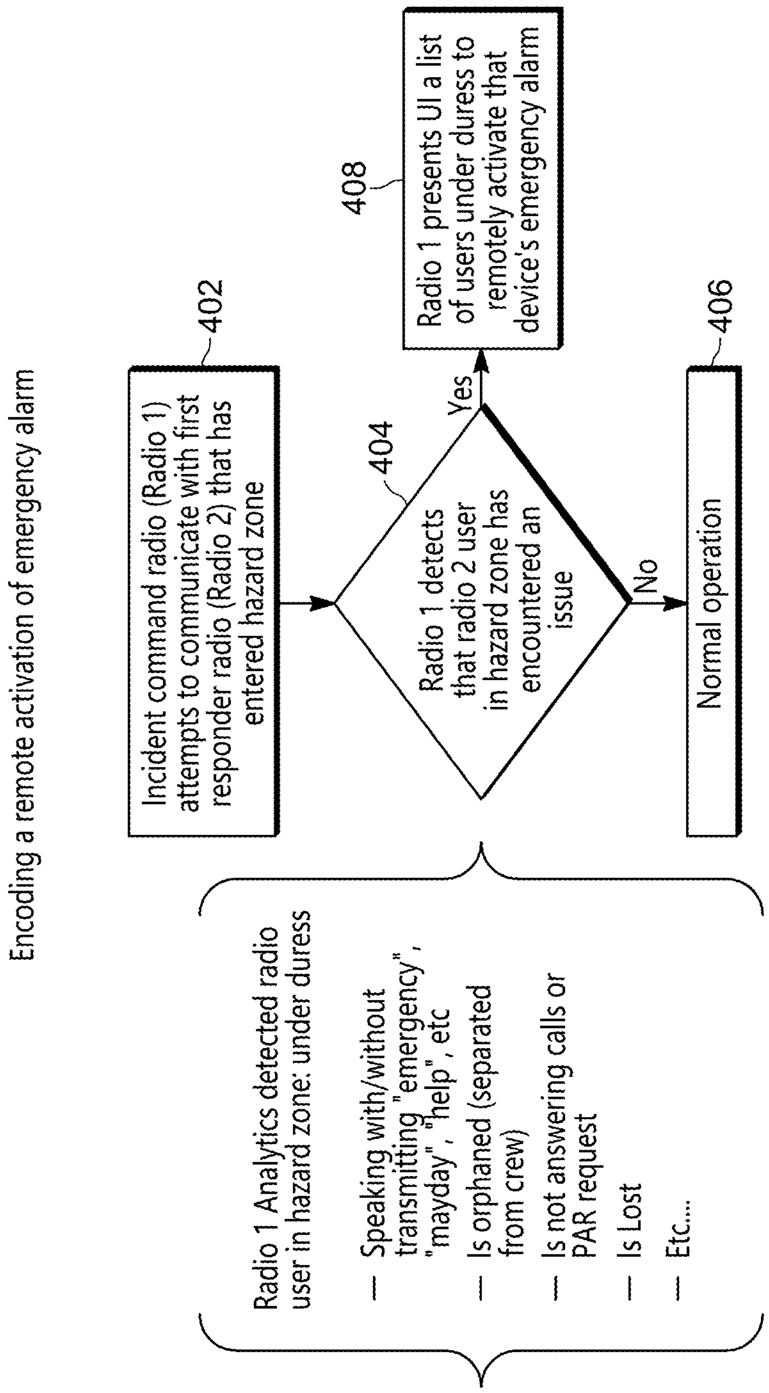
FIG. 4. depicts a detailed view of measurable parameters and analytics performed thereon at the incident command radio to detect a state of emergency at the first responder radio in accordance with some embodiments.

FIG. 4 depicts a more detailed view 400 of measurable parameters and analytics performed by the incident command radio 102 in response to a failed communication attempt at 402, and as previously described in conjunction with FIGS. 1, 2, and 3 in accordance with some embodiments. As mentioned previously, the parameters are pre-stored in the memory 108 of the incident command radio 102, wherein the parameters are measurable parameters associated with detecting duress of a radio user of the first responder radio 104.

Referring to FIGS. 1, 2 and 4, upon a failed attempt at communication by the incident command radio 102 with the first responder radio 104 that has entered the hazard zone 202, the incident commander radio 102 measures parameters of the first responder radio 104 at 404. The parameters may comprise on one or more of: a location parameter, an audio parameter, and/or a radio operation parameter, the measured parameters being associated with the first responder radio 104. The measurement of parameters may be triggered automatically in response to the failed communication attempt. The measured parameters and analytics performed thereon are processed by the controller 106 of the incident command radio to detect duress of a radio user of the first responder radio 104.

Continuing to refer to FIGS. 1, 2 and 4, the controller 106 of incident command radio 102 may be configured to measure location parameter(s) and apply location analytics to the first responder radio 104 to determine a lost radio user. For example, measuring the location parameter and performing a location analytic thereon may comprise one or more of: detecting location of the first responder radio 104 as being separated beyond a predetermined distance threshold of an assigned group of other first responder radios; and/or detecting location of the first responder radio 104 as being outside of an assigned path, to name a few. Other location parameters, such as elevation (floor in building), proximity to another firefighter and/or specific room in a structure (to name a few) may be measured and associated location analytics applied thereto.

Continuing to refer to FIGS. 1, 2 and 4, the controller 106 of incident command radio 102 may be configured to measure one or more audio parameters and apply audio analytics thereto. For example NLP processing may be applied as an audio analytic to determine a distressed radio user on received (or lack of received audio). For example, the audio parameter measurement and audio analytic may comprise one or more of: opening a microphone of the first responder radio 104 and performing NLP audio analytics to detect lack of speech by the first responder; and/or opening a microphone of the first responder radio and performing NLP audio analytics to detect distressed speech without PTT transmission. The opening of the microphone of first responder radio 104 may be triggered automatically by the incident command radio 102 in response to the failed communication attempt. Other audio parameters associated with the first responder and/or contextual environment surrounding the first responder, such as lack or reduced motion, orientation of first responder, and/or detection of a struggle/entrapment (to name a few) may be measured by controller 106 and associated audio analytics applied thereto.

Continuing to refer to FIGS. 1, 2 and 4, the controller 106 of incident command radio 102 may be configured to measure one or more radio operation parameters and apply radio operation analytics thereto. For example, the radio operation parameter and radio operation analytic may comprise one or more of: measuring the number of unanswered calls made to the first responder radio 104 and applying radio operation analytics to detect whether the number of unanswered calls exceeds a predetermined unanswered call threshold and/or detecting one or more personal accountability report (PAR) requests sent periodically or after a significant event by the incident command radio 102 have been left unanswered by the first responder radio 104; and/or detecting a sudden decline in PTT presses below a PTT threshold and/or sudden decline in user display selections over a predetermined time threshold, and/or a sudden decline in motion of first responder radio over a predetermined time.

Continuing to refer to FIGS. 1, 2 and 4, some or all of the measured parameters and associated analytics at 404 may be aggregated to determine that the radio user of the first responder radio 104 is under duress. The duress level may be scored based on the aggregation. If no duress is detected, then normal radio operation proceeds at 406. The above parameter measurements and analytics may similarly be applied to a plurality of other first responder radios that have entered the hazard zone 202 of FIG. 2 and with which the incident command radio 102 has encountered a failed attempt at communication. When duress of a first responder radio 104 is detected by incident command radio 102, then the incident command radio proceeds to 408.

At 408, the incident command radio 102 presents a user selectable list to the UI display 114 of FIG. 1, the list identifying the current radio user under duress as well as other users currently under duress (but not currently in emergency) within the hazard zone. The incident commander may then select which first responder radios to remotely activate an emergency alarm. Commander control over the selection allows the incident commander to monitor the list and avoid false positives.

In some embodiments, the user selectable list may (at 408) further identify the duress scoring level (e.g. high, medium, low) to facilitate initial selection of the remote activation of the emergency alarm to those radios presenting the highest level of duress.

In some embodiments the remote activation of the emergency alarm may be automatic depending on the level of duress, however the user selectable list may also be configured to permit the incident commander to retain control of the selection as the incident commander may be aware of additional context associated with the incident.

In some embodiments, remote activation of the emergency alarm by the incident command radio comprises selecting one or more contacts from a user selectable list of contacts that have been filtered for indications of duress and activating PTT of the incident command radio to send the remote emergency activation to one or more radios associated with the selected contact(s) from the list. A confirmation message may be displayed or audible tone generated, at the incident command radio to confirm that the remote activation of the emergency alarm(s) was sent.

In some embodiments, the remote activation of the emergency alarm at the first responder radio 104 may generate a plurality of emergency tones to help locate the radio user of first responder radio 104. In response to the remote activation of the emergency alarm at 408, the first responder radio 104 may further be configured to broadcast a BLUETOOTH beacon identifying first responder radio location. Broadcasting the BLUETOOTH beacon by the first responder radio 104 facilitates the ability of other nearby radio users of other first responder radios operating within the hazard zone 202 to locate the first responder radio 104 and its associated radio user.

Figure 5:
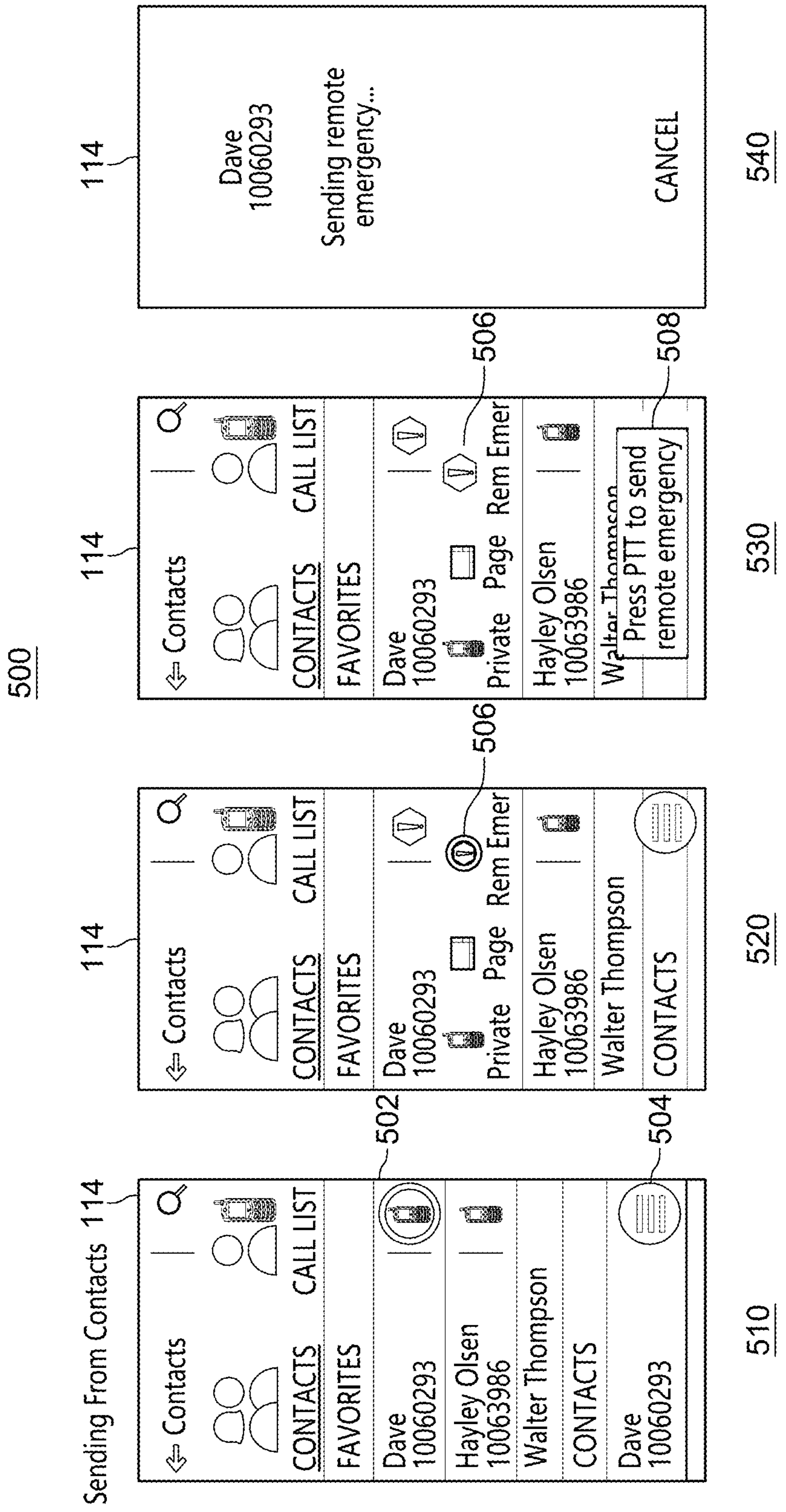
FIG. 5 depicts an example sequence of the user interface display of the incident command radio of FIG. 1 displaying user selectable features in accordance with some embodiments.

FIG. 5 depicts an example sequence 500 of the user interface display of FIG. 1 displaying user selectable features in accordance with some embodiments. In this example, user interface display 114 of incident command radio 102 provides for remote activation of emergency to selectable.

At view 510, a user selectable list of registered radio users (e.g. Dave, Hayley and Walter) having recent communication. One of the radio users (e.g. Dave) is further displayed as being currently under duress at 502. The incident commander may select the first responder (e.g. Dave/and associated ID) at 502.

The user selection may trigger a quick action (QA) icon 504 for association with the selected contact. The incident commander may then long press the QA icon 504 associated with the selected contact to open a drop down menu presented at view 520. The drop down menu presented at view 520 includes the selected contact and a remote emergency icon, such as shown at 506. The display may present a toast message 508 indicating that pressing the PTT 112 to send remote activation of the emergency alarm at view 530. The UI interface display 114 at view 540 presents a confirmation of the remote emergency, such as a call alert, being sent to the selected first responder radio 104, along with an option to cancel.

In the example of FIG. 5, if all three registered users (e.g. Dave, Hayley and Walter) are indicated as being under duress, then multi-selectable options may be presented at the incident command radio.

Figure 6:
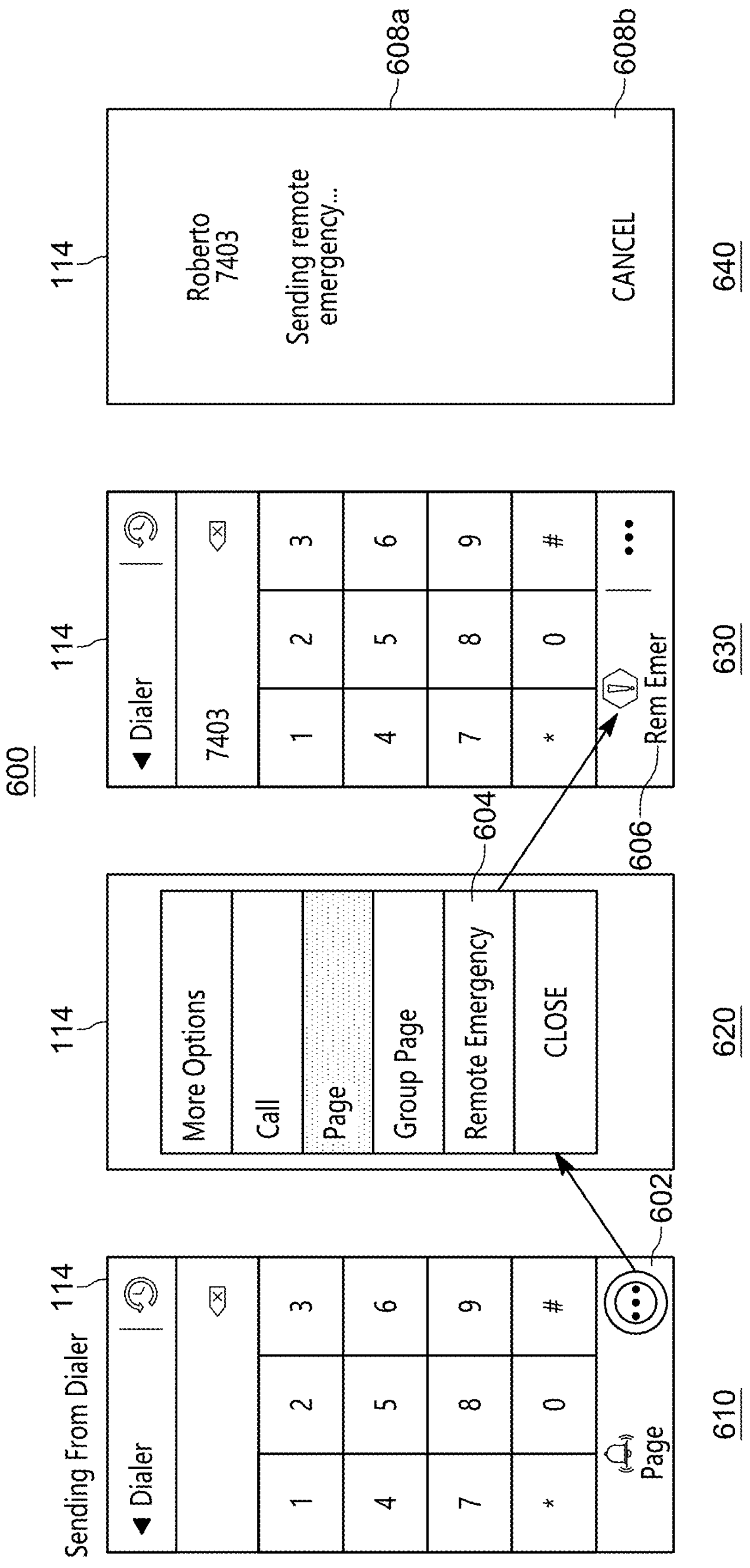
FIG. 6 depicts another example sequence of the user interface display of the incident command radio of FIG. 1 displaying user selectable features in accordance with some embodiments.

FIG. 6 depicts another example sequence of the user interface display of FIG. 1 displaying user selectable features in accordance with some embodiments. In this example, user interface display 114 of incident command radio 102 provides for remote activation of emergency to selectable contacts via a dialer. In this example, the incident commander taps a "more options" icon 602 to change the call type. The more options display screen at 620 presents a plurality of call options including 'Remote Emergency' option at 604. A dialer display screen at 630 is configured to enter a dial number (e.g. shown as 7403 assigned to Roberto) and press PTT 112 to initiate the remote emergency activation via icon 606 At 640, the user interface display 114 presents sending remote emergency at 608*a* to the dialed recipient, along with an option to cancel at 608*b*.

Figure 7:
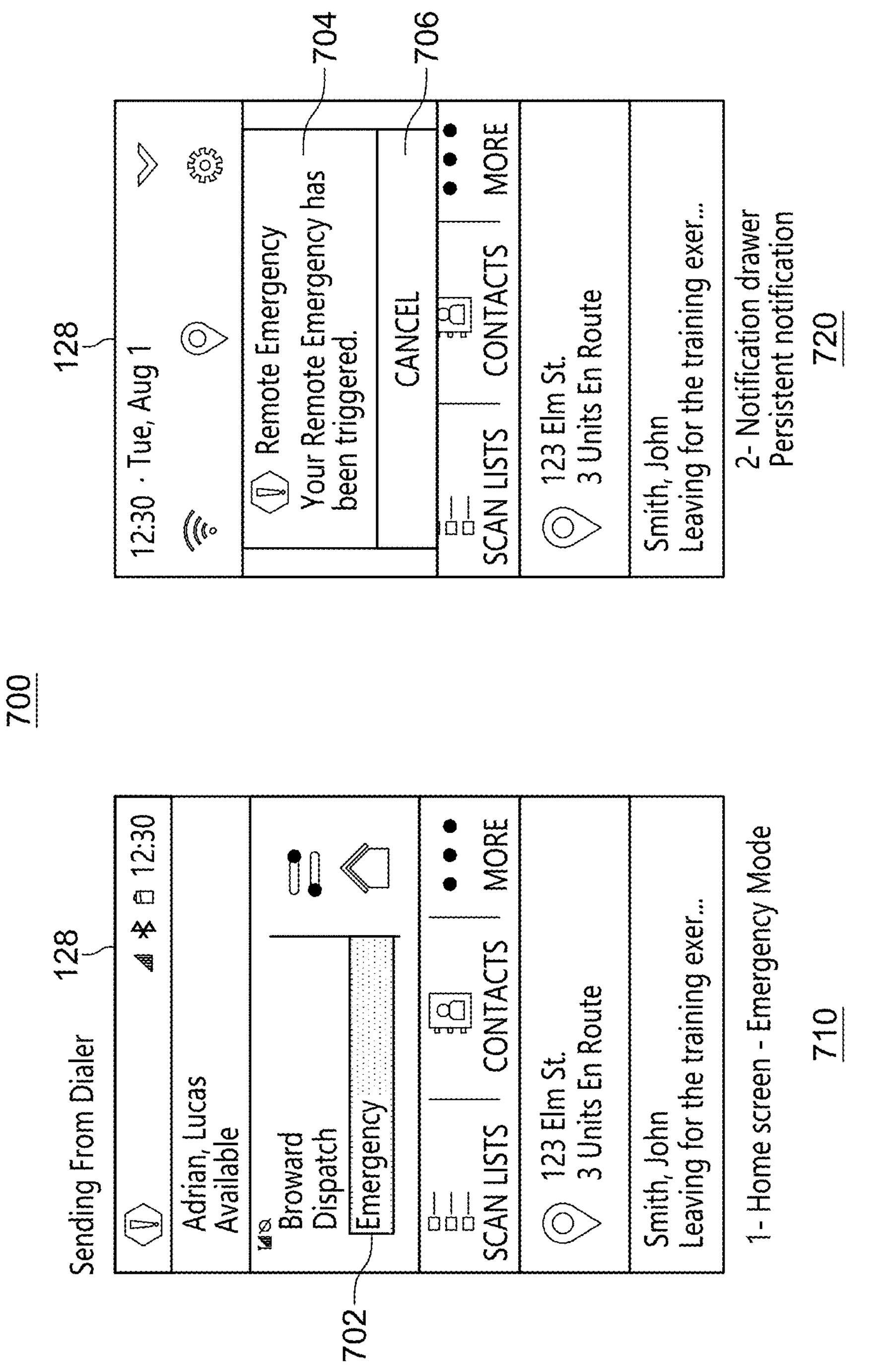
FIG. 7 depicts screen views for the first responder radio with emergency alarm activated in accordance with some embodiments.

FIG. 7 depicts screen views 700 for the first responder radio in receipt of the emergency alarm in accordance with some embodiments. In this example, at view 710 the user interface display 128 of first responder radio 104 shows the remote activation of emergency triggered by the incident command radio. At 710, a home screen of the first responder radio 104 identifies a remote emergency alert at 702. At view 720, the user interface display 128 provides persistent notifications that the remote emergency has been triggered, while the audible alarm is being sounded. The user interface display 128 further provides a user selectable option to cancel. Hence, if the radio user of the first responder radio 104 is capable of cancelling the alert, there is an option to do so, if desired.

Figure 8:
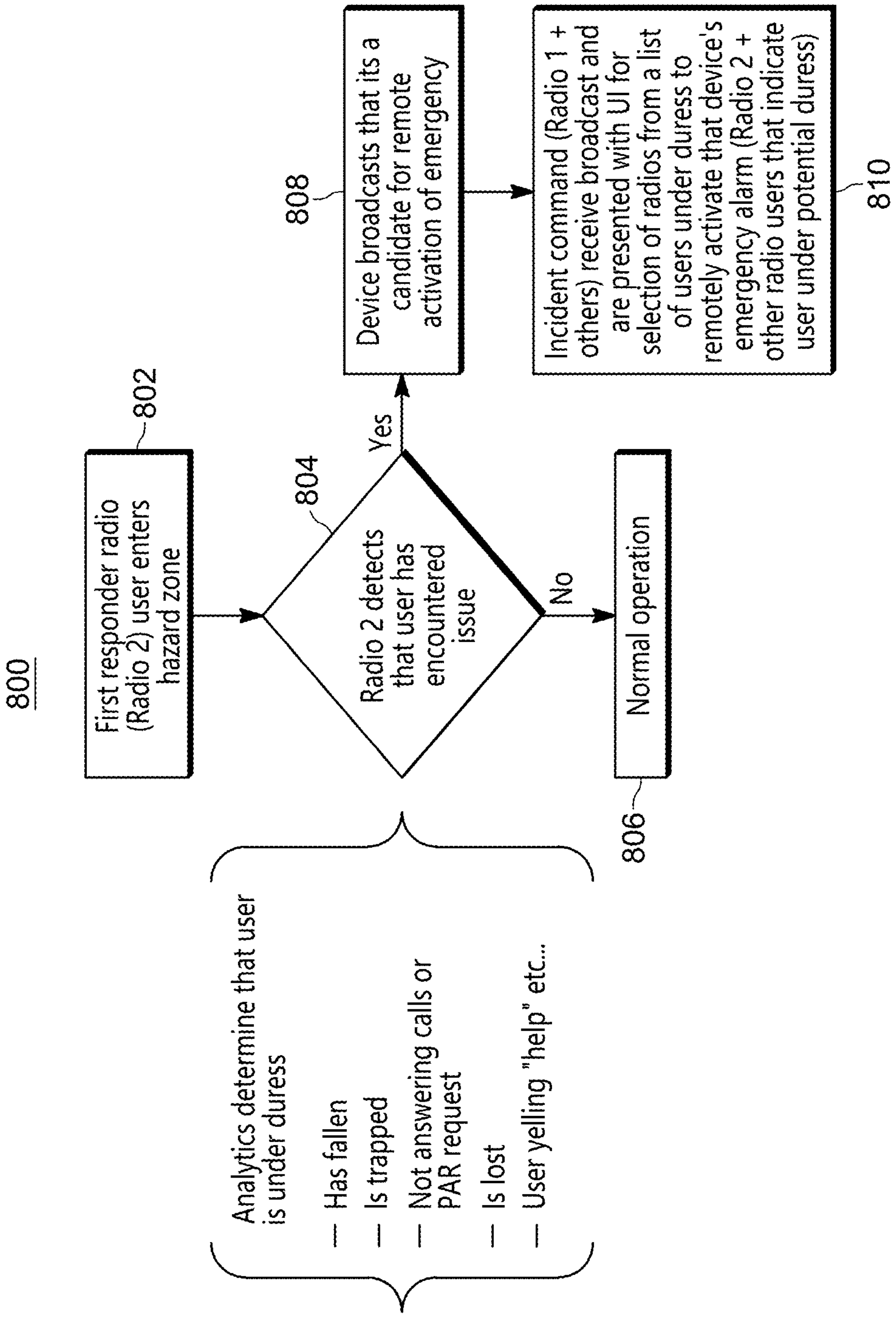
FIG. 8 depicts a detailed view of an alternative embodiment in which duress is detected at a first responder radio itself for remote activation by the incident command radio in accordance with an alternative embodiment.
Figure 9:
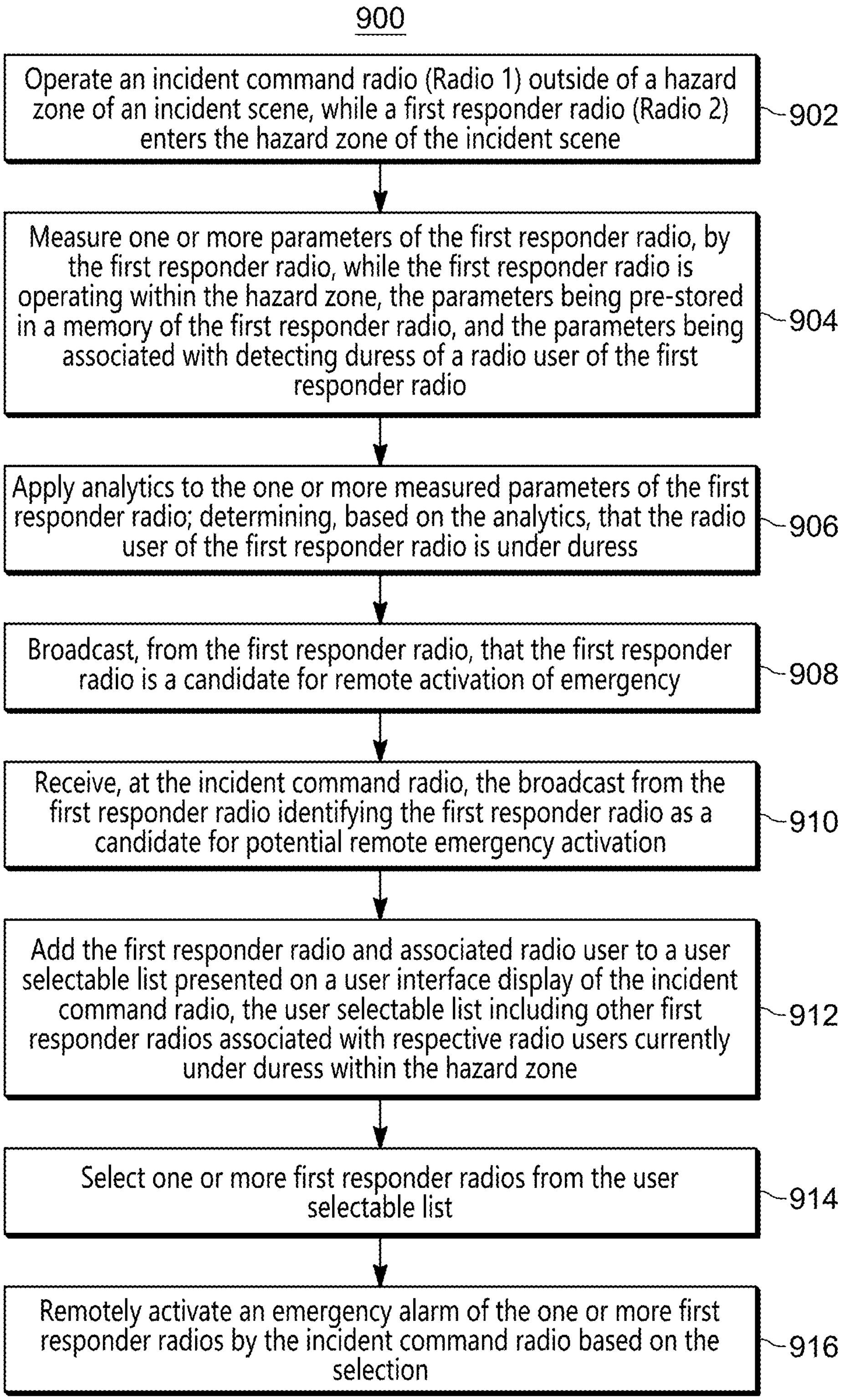
FIG. 9 depicts a flowchart of a method in which a first responder radio performs analytics on itself, and an incident command radio remotely activates an emergency alarm at the first responder radio in accordance with the alternative embodiment.

FIGS. 8 and 9 depict an alternative embodiment in which the detection of duress occurs at the first responder radio 104 of FIG. 1 when operating within a hazard zone 206 of an incident scene 200 of FIG. 2.

FIG. 8 depicts an alternative embodiment 800 in which the first responder radio 104 determines the duress of the radio user while operating in the hazard zone based on analytics being performed at the first responder radio side. As mentioned back at FIG. 1, the first responder radio 104 comprises controller 116 operatively to transceiver 120, memory 118, user interface display 128. The controller is configured to manage two-way communications with the incident command radio 102. At 802, the first responder radio 104 enters the hazard zone of the incident scene, such as the hazard zone 202 of the incident scene 200 of FIG. 2, while the incident command radio 104 operates outside of the hazard zone 202.

In the alternative embodiment 800, the controller 116 of the first responder radio 104 is configured to: measure one or more parameters 803 of the first responder radio 104, while the first responder radio is located within the hazard zone 202. The parameters listed at 803 are pre-stored in the memory 118 of the first responder radio, and the parameters being associated with detecting duress of a radio user of the first responder radio 104. The controller 116 is further configured to apply analytics to the one or more measured parameters of the first responder radio at 803. If the controller determines at 804, based on the analytics of 803, that the radio user of the first responder radio 104 is not under duress, then normal operation continues at 806. If at 804, the controller 116 determines, based on the analytics, that the radio user of the first responder radio 104 is under duress, then the controller initiates a broadcast at 808, from the first responder radio, indicating that first responder radio 104 is a candidate for remote activation of emergency.

At 810, the incident command radio 102, receives the broadcast from the first responder radio 102 identifying the first responder radio as a candidate for potential remote emergency activation. At 810 the incident command radio adds the first responder radio and associated radio user to a user selectable list of the incident command radio. The user selectable list is presented on the user interface display 114 of the incident command radio 102. The user selectable list may include other first responder radios associated with respective radio users currently under duress within the hazard zone. At 810, based on a user selection from the user selectable list, the incident command radio 102 remotely activates an emergency alarm of the one or more first responder radios currently under duress. Hence, the remote activation of the alarm at the first responder radio 104 takes place without operating the first responder radio in an emergency mode and without activating the emergency button 130 at the first responder radio 104.

Referring back to 804, the measurable parameters may comprise on one or more of: a location parameter, an audio parameter, and/or a radio operation parameter, the measured parameters being associated with the first responder radio 104. At 804, the measured parameters and analytics performed thereon are processed by the controller 116 of the first responder radio 104 to detect duress of a radio user of the first responder radio 104.

Continuing to refer to 804 refer to 804 of FIG. 8 and FIG. 1, the controller 116 of first responder radio 104 may be configured to measure location parameter(s) and apply location analytics to the first responder radio 104 to determine a lost radio user. For example, measuring the location parameter and performing a location analytic thereon may comprise one or more of: detecting location of the first responder radio 104 as being separated beyond a predetermined distance threshold of an assigned group of other first responder radios; and/or detecting location of the first responder radio 104 as being outside of an assigned path, to name a few.

Continuing to refer to 804 refer to 804 of FIG. 8 and FIG. 1, the controller 116 of first responder radio 104 may further be configured to measure one or more audio parameters and apply audio analytics thereto. For example NLP processing may be applied as an audio analytic to determine a distressed radio user on received (or lack of received audio). For example, the audio parameter measurement and audio analytic may comprise one or more of: opening a microphone of the first responder radio 104 and performing NLP audio analytics to detect lack of speech at the first responder radio; and/or opening a microphone of the first responder radio and performing NLP audio analytics to detect distressed speech without PTT transmission. The opening of the microphone of first responder radio 104 may be triggered automatically/periodically by the first responder radio Other audio parameters, such as distress sounds, sounds of struggle or entrapment and/or sounds of debris or wall or ceiling falling (to name a few) may be measured by controller 116 and associated audio analytics applied thereto.

Continuing to refer to 804 of FIG. 8 and FIG. 1, the controller 116 of first responder radio 104 may further be configured to measure one or more radio operation parameters and apply radio operation analytics thereto. For example, the radio operation parameter and radio operation analytic may comprise one or more of: measuring the number of unanswered calls made to the first responder radio 104 and applying radio operation analytics to detect whether the number of unanswered calls exceeds a predetermined unanswered call threshold and/or detecting one or more personal accountability report (PAR) requests sent periodically or after a significant event by the incident command radio 102 have been left unanswered by the first responder radio 104; and/or detecting a sudden decline in PTT presses below a PTT threshold and/or sudden decline in user display selections over a predetermined time.

FIG. 9 depicts a flowchart of a method 900 in which first responder radio 104 performs analytics on itself, and an incident command radio remotely activates an emergency alarm at the first responder radio in accordance with the alternative embodiment.

The method begins at 902 with operating an incident command radio, such as incident command radio 104, outside of a hazard zone of an incident scene, such as shown in FIG. 1 and FIG. 2 while a first responder radio enters the hazard zone of the incident scene. The method proceeds to 904 measuring one or more parameters of the first responder radio, by the first responder radio, while the first responder radio is operating within the hazard zone, the parameters being pre-stored in a memory, such as memory 118 of the first responder radio 104, the parameters being associated with detecting duress of a radio user of the first responder radio.

The method proceeds to 906 with applying analytics to the one or more measured parameters of the first responder radio, and determining at 908, based on the analytics, that the radio user of the first responder radio 104 is under duress.

The method continues at 908 with broadcasting, from the first responder radio 104, that indicates that the first responder radio is a candidate for remote activation of emergency.

The method continues at 910 with receiving, at the incident command radio 102, the broadcast from the first responder radio 104 identifying the first responder radio as a candidate for potential remote emergency activation. The method continues at 912 with adding the first responder radio identification and associated radio user to a user selectable list presented on a user interface display 114 of the incident command radio, the user selectable list including other first responder radios associated with respective radio users currently under duress within the hazard zone.

The method proceeds at 914 with selecting one or more first responder radios, by the incident command radio 102, from the user selectable list, and at 916, remotely activating an emergency alarm of the one or more first responder radios by the incident command radio based on the selection.

The alternative embodiment provided by FIGS. 8 and 9 provides an advantage of not requiring a communication attempt by the incident command radio 102.

Accordingly, there has been provided an incident command radio configured to provide remote activation of an emergency alarm at a first responder radio, where the first responder radio user is determined to be under duress, and where the first responder radio is not currently operating in an emergency mode. In some embodiments, the incident command radio performs parameter measurements and analytics to determine duress of a radio user of the first responder radio. In other alternative embodiments, the parameter measurements and analytics applied thereon may be performed by the first responder radio itself. In both embodiments, the incident command radio controls the remote activation of the emergency alarm at the first responder radio.

As should be apparent from this detailed description above, the operations and functions of electronic computing devices, such as public safety radios, are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot measure parameters of a public safety radio, apply analytics thereon to detect duress, and remotely activate an emergency alarm.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

operating an incident command radio outside of a hazard zone of an incident scene, while a first responder radio enters the hazard zone of the incident scene;

measuring one or more parameters of the first responder radio, by the first responder radio, while the first responder radio is operating within the hazard zone, the one or more parameters being pre-stored in a memory of the first responder radio, and the one or more parameters being associated with detecting duress of a radio user of the first responder radio;

applying analytics to the one or more measured parameters of the first responder radio; determining, based on the analytics, that the radio user of the first responder radio is under duress;

broadcasting, from the first responder radio, that the first responder radio is a candidate for remote activation of emergency;

receiving, at the incident command radio, the broadcast from the first responder radio identifying the first responder radio as a candidate for potential remote emergency activation;

adding the first responder radio and associated radio user to a user selectable list presented on a user interface display of the incident command radio, the user selectable list including other first responder radios associated with respective radio users currently under duress within the hazard zone; and selecting one or more first responder radios from the user selectable list; and remotely activating an emergency alarm of the one or more first responder radios by the incident command radio based on the selection.

2. The method of claim 1, wherein the remotely activating the emergency alarm occurs while the first responder radio is not currently operating in an emergency mode, and without activation of an emergency button at the first responder radio.

3. The method of claim 1, wherein measuring the one or more parameters of the first responder radio, by the first responder radio, and applying analytics to the one or more measured parameters of the first responder radio, comprises:

measuring a location parameter and applying a location analytic;

measuring an audio parameter and applying an audio analytic; and measuring a radio operation parameter and applying a radio operation analytic.

4. The method of claim 3, wherein measuring the location parameter and applying the location analytic, comprise one or more of:

measuring the location of the first responder radio as being separated beyond a predetermined distance threshold of an assigned group of other first responder radios; and detecting location of the first responder radio as being outside an assigned path.

5. The method of claim 3, wherein measuring the audio parameter and applying the audio analytic, comprises one or more of:

opening a microphone of the first responder radio and performing audio analytics to detect lack of speech by the first responder; and opening the microphone of the first responder radio and performing audio analytics to detect distressed speech without transmission.

6. The method of claim 3, wherein measuring the radio operation parameter and applying the radio operation analytic, comprises one or more of:

measuring number of unanswered calls made to first responder radio and applying radio operation analytics to detect the number of unanswered calls exceeds a predetermined unanswered call threshold;

detecting one or more personal accountability report (PAR) requests have gone unanswered over a predetermined time; and number of PTT presses being below a PTT press threshold.

7. A communication system, comprising:

an incident command radio; and a first responder radio, the first responder radio comprising;

a transceiver, a memory and a controller operatively coupled for two-way communications with the incident command radio, the first responder radio operating within a hazard zone of an incident scene, while the incident command radio operates outside of the hazard zone, the controller of the first responder radio being configured to:

measure one or more parameters of the first responder radio, by the first responder radio, while the first responder radio is operating within the hazard zone;

apply analytics to the one or more measured parameters of the first responder radio; determine, based on the analytics, that the radio user of the first responder radio is under duress;

broadcast, from the first responder radio, that the first responder radio is a candidate for remote activation of emergency;

receive, at the incident command radio, the broadcast from the first responder radio identifying the first responder radio as a candidate for potential remote emergency activation;

add the first responder radio and associated radio user to a user selectable list of the incident command radio;

present the user selectable list on a user interface display of the incident command radio, the user selectable list including other first responder radios associated with respective radio users currently under duress within the hazard zone; and remotely activate an emergency alarm of the first responder radio by the incident command radio based on a selection made from the user selectable list.

8. The communication system of claim 7, wherein the one or more parameters are pre-stored in the memory of the first responder radio, and the one or more parameters being associated with detecting duress of a radio user of the first responder radio.

9. The communication system of claim 8, wherein the one or more parameter comprise:

a location parameter of the first responder radio;

an audio parameter of the first responder radio; and a radio operation parameter of the first responder radio.

10. The communication system of claim 7, wherein the remote activation of the emergency alarm takes place when the first responder radio is not currently operating in an emergency mode and without activation of an emergency button at the first responder radio.

11. The communication system of claim 7, wherein remote activation of the emergency alarm by the incident command radio comprises:

activating a push-to-talk (PTT) at the incident command radio to send the remote activation of the emergency alarm to the selected contact; and displaying a confirmation in response to the PTT press, confirming that the remote activation of emergency has been sent to the selected contact.

12. The communication system of claim 7, wherein the user selectable list is updated in response to additional first responder radios entering the hazard zone and sending a trigger to the incident command radio.

* * * * *